| United States Patent [19] | [11] Patent Number: 4,510,057 |
|---|---|
| Rowe et al. | [45] Date of Patent: Apr. 9, 1985 |

[54] ROTATING DISK BIOTREATMENT OF SYNGAS WASTE WATER

[75] Inventors: Edward H. Rowe; Lloyd J. Parcell, both of Beaumont, Tex.

[73] Assignee: Texaco Inc., White Plains, N.Y.

[21] Appl. No.: 542,867

[22] Filed: Oct. 17, 1983

[51] Int. Cl.³ ............................................. C02F 3/08
[52] U.S. Cl. ..................................... 210/612; 210/619; 210/904
[58] Field of Search .............. 210/904, 619, 612, 150, 210/151, 610; 435/262, 253

[56] References Cited

U.S. PATENT DOCUMENTS

| 4,211,646 | 7/1980 | Westbrook et al. | 210/904 |
| 4,239,620 | 12/1980 | Doll et al. | 210/904 |
| 4,311,597 | 1/1982 | Bhattacharyya | 210/904 |
| 4,440,644 | 4/1984 | Mudder et al. | 210/619 |

*Primary Examiner*—Benoit Castel
*Attorney, Agent, or Firm*—Jack H. Park; Kenneth R. Priem; Richard A. Morgan

[57] ABSTRACT

A method for environmentally upgrading waste water containing formates, cyanides and ammonia is disclosed. Formates and cyanides are biodegraded by aerobic bacteria immobilized on the disks of a rotating disk contactor. Ammonia is air stripped.

The present method eliminates the steam stripping stage of conventional processes as well as the lime addition and precipitation stages.

5 Claims, No Drawings

4,510,057

ROTATING DISK BIOTREATMENT OF SYNGAS WASTE WATER

BACKGROUND OF THE INVENTION

1. Field of the Invention

This invention relates to the aerobic biodegration of contaminants in waste water by means of a rotating disk contactor.

2. Description of the Prior Act

The partial oxidation of distillate hydrocarbons to produce a gaseous mixture of hydrogen and carbon monoxide in the synthesis gas process is well known. According to this process, a carbonaceous gas or a distillate fuel, such as fuel oil, naphtha, methane, propane and refinery off-gases, and an oxygen-rich gas are introduced into a free-flow, non-catalytic synthesis gas generator at a temperature in the range from about 1500° to 3000° F. and a pressure in the range of about 1 to 250 atmospheres to effect the partial oxidation of the carbonaceous fuel to a synthesis gas stream comprising a mixture of hydrogen, carbon monoxide, carbon dioxide and water together with relatively minor amounts of hydrogen sulfide, carbonyl sulfide, argon, nitrogen, cyanide, ammonia and methane. Water is used as a quench medium to cool the synthesis gas produced in the generator. After the separation of the synthesis gas and a major proportion of the volatile by-product gases, such as $CO_2$ and $H_2S$, from the quench water, a waste water stream remains containing small amounts of cyanides, formates and other by-products of the reaction. While this waste water stream contains toxic by-products of the synthesis gas process, it is, nevertheless, suitable as a recycle stream for the process either in admixture with the feed to the synthesis gas generator or as the quench medium to cool the hot synthesis gas mixture issuing from the gas generator. No waste water disposal problem occurs when the waste water stream can be continuously recycled in the synthesis gas process.

The reduced availability of natural gas and of petroleum gases and distillates as feedstocks materials has led to intensive efforts to develop other carbonaceous materials as fuels in the synthesis gas process. Among the carbonaceous materials under intensive investigation are petroleum residuum, petroleum coke, subbituminous, bituminous and anthracite coal, lignite, shale, organic waste material, sewage sludge, crude oil residues, coke and liquified coal and coal fractions.

When the fuel employed in a synthesis gas process contains significant amounts of water-soluble salts, such as a halide of a metal or ammonia, these salts are transferred to the waste water together with the cyanides and the formates produced in the process. While the concentration levels of these impurities in the waste water remains low, the waste water or at least a portion thereof can be recycled to the synthesis gas process either to be mixed with the fuel feed to the generator or introduced into the quench zone of the generator to cool the hot gaseous product being produced. However, when the concentration levels of the impurities in the waste water are high or become high as a result of recycling, then a waste water stream must be withdrawn and disposed of. Since this waste water contains environmentally significant amounts of cyanides and formates, and at least one halide salt of a metal or ammonia, it is characterized as having toxic, oxygen demanding and corrosive properties. The toxicity of the cyanides and the biochemical oxygen demand (BOD) of the formates are well established.

A variety of materials of a carbonaceous nature may be employed as the feed material or fuel to a synthesis gas process as indicated above. The compositions of these materials as well as the by-products produced and the waste water stream from the process vary greatly. In certain instances the waste water will contain metals including such metals as nickel and the transition metals chromium and vanadium, as well as ammonia and sulfides in combination with the previously noted environmentally significant components of the waste water stream.

U.S. Pat. No. 4,211,646, incorporated herein by reference, relates to a process for removing cyanide, sulfide, ammonia, soot and insoluble metals in the scrubbing water from a partial oxidation process. Ferrous sulfate and lime addition, followed by clarification, filtration and steam stripping are employed.

As this reference indicates, aerobic biodegradation has been used to treat waste water to reduce formates. Steam stripping of ammonia adds an additional processing stage and the lime addition step is particularly troublesome because it can be hazardous to workmen, is messy and expensive.

There exists a need in the art to environmentally upgrade waste water streams, particularly blow down water from a partial oxidation process for the production of synthesis gas by the partial oxidation of a liquid hydrocarbon fuel, without going through a separate ammonia stripping stage and a lime addition stage to remove cyanides.

SUMMARY OF THE INVENTION

In accordance with this method, a toxic, oxygen demanding and corrosive waste water stream, which contains environmentally significant amounts of cyanides, formates and ammonia, is environmentally upgraded by stripping ammonia and aerobically biodegrading cyanides and formates. In an improved method, aerobic bacteria is immobilized on a plurality of disks of a rotating disk contactor. The disks are positioned and rotated so as to successively wet aerobic bacteria with waste water and expose the bacteria to air. The disks are rotated at 0.25 to 25 rpm and the waste water pH is maintained at 6 to 9.5 and residence time maintained at 1 to 15 days. Ammonia is air stripped and the cyanides and formates biodegraded to produce an environmentally upgraded waste water stream.

DESCRIPTION OF THE PREFERRED EMBODIMENTS

The present invention is a method for environmentally upgrading a waste water stream characterized by having toxic, oxygen demanding and corrosive properties due to the presence of cyanides, formates and ammonia, which method consists essentially of stripping ammonia and treating cyanides and formates with aerobic bacteria thereby degrading cyanides and formates, and as a result environmentally upgrading the waste water stream.

The invention is also a method for environmentally upgrading a waste water stream containing environmentally significant amounts of by-products from a process for the production of synthesis gas including at least 5 parts per million of cyanides, at least 100 parts per million of formates and at least 25 parts per million of a halide of a metal or ammonium, which method consists essentially of stripping ammonia and treating cyanides and formates with aerobic bacteria thereby degrading cyanides and formates and as a result environmentally upgrading the waste water stream.

The invention is also a method for environmentally upgrading a waste water stream produced in the quench step of a process for the production of synthesis gas by reacting a carbonaceous fuel with an oxygen rich gas in a free flow, non-catalytic synthesis gas generator at a temperature in the range of from a 1500° F. to 3000° F. and a pressure in the range of 1 to 250 atmospheres, the waste water stream being characterized by having toxic and corrosive properties due to the presence of environmentally significant amounts of cyanides, formates and ammonia, which method consists essentially of stripping ammonia and treating cyanides and formates with aerobic bacteria thereby degrading cyanides and formates and as a result environmentally upgrading the waste water stream.

The improvement in the present method comprises immobilizing the aerobic bacteria on a plurality of disks of a rotating disk contactor; positioning and rotating the disks relative to the waste water and air such that the immobilized bacteria are successively wetted with the waste water and exposed to air; rotating the disks at a velocity of 0.25 to 25 rpm preferably 0.5 to 2 rpm maintaining a waste water pH of 6 to 9.5 preferably 8 to 9 most preferably about 9 and residence time of 1 to 15 days preferably 1 to 3 days thereby air stripping the ammonia and bacterially degrading the cyanides and formates.

The waste water stream that can be upgraded by the novel process of the invention is characterized as a toxic, oxygen demanding and corrosive waste water stream due to the presence therein of an environmentally significant amount of cyanides, formates and ammonia. Such a waste water stream is generated, for example, in a synthesis gas process in which the fuel feed to the gas generator is a petroleum residuum, petroleum coke, subbituminous, bituminous, or anthracite coal or liquified coal fractions, lignite, shale, organic waste material, sewer sludge, crude oil residues, coke and liquified coke or similar crude or impure carbonaceous material. While a synthesis gas process can generally be conducted at a temperature ranging from about 1500° F. to 3000° F., it has been found advantageous with certain of the foregoing fuels to employ a temperature in the generator ranging from about 2200° F. to 3000° F.

It will be understood that gaseous carbonaceous feedstocks, such as natural gas, methane, ethane or propane, or distillate carbonaceous feedstocks, such as naphtha, and butane, when employed as a fuel in the noted synthesis gas process, do not produce a waste water stream having both toxic and corrosive properties and therefore such a waste water stream does not require treatment by the special process that is described herein.

The waste water stream for which the present process is particularly intended can be described as a toxic, oxygen demanding and corrosive waste water stream containing significant amounts of cyanides, formates and ammonia.

The waste water intended for treatment in the prescribed process of the invention will contain total cyanides (i.e., free and combined cyanides) in a concentration ranging from about 5 ppm (parts per million) on a weight basis up to 1000 ppm or more. More commonly, the concentration range of the cyanides in the waste water will be from about 10 to 100 ppm. An environmentally significant amount of cyanides is herein defined as 5 ppm. or above. In general, environmental regulations prohibit the disposal in sewers and streams of a waste water containing significant amounts of cyanides.

Another major component of the waste water to be treated by the process of the invention is the formates. These compounds, which are inherently produced in a process such as the synthesis gas process, give the waste water a high biochemical oxygen demand (BOD) rendering it unsuitable or unacceptable for discharge. The waste water stream intended for treatment in the prescribed process will contain formates in a concentration ranging from about 100 to 20,000 ppm with the more common range being from about 500 to 10,000 ppm. An environmentally significant amount of formates is defined herein as 100 ppm or above.

Ammonia is inevitably produced in a partial oxidation process and a substantial portion of the ammonia will be dissolved in waste water. The concentration of the ammonia in the waste water effluent of a synthesis gas process can range from about 100 to 10,000 ppm with the more common ammonia concentration range being from about 500 to 5000 ppm. Ammonia in an amount of 50 ppm or more is considered environmentally significant.

Ammonia is stripped from the waste water merely by its exposure to air. The volatility of ammonia is such that the continual exposure to air by the method of the present invention will air strip the ammonia to environmentally acceptable levels.

The conversion of cyanides, formates and other organic carbonaceous matter in the waste water to carbon dioxide and a biological residue is achieved using biologically active solids or biota immobilized on the disks of a rotating disk contactor. The waste water typically at a pH from 9 to 11 is introduced to the immobilized aerobic bacteria at a temperature range of about 5° C. to 40° C. The rotating disk contactor acts to constantly agitate the waste water thereby exposing ammonia to the air and cyanides and formates in aerated water to the bacteria.

It is desirable to monitor the composition of the entering waste water stream in order to ensure the presence of sufficient nitrogen and phosphorus nutrients for optimum bacterial performance. In the event of any nutrient deficiency, nutrients can be supplied according to conventional procedures.

The waste water which issues from bacterial treatment will be a substantially upgraded waste water stream due to the removal of a major amount of the toxic cyanides, the BOD contributing organic carbon components such as the formates and the air stripping of ammonia. In general, with the removal of the toxic cyanides and of the oxygen demanding organic carbon components, the resulting waste water is environmentally suitable for disposal in the conventional manner.

In the practice of the present invention, the prescribed waste water is introduced for treatment. This treatment can be effected at any temperature ranging from about room temperature up to a temperature below the boiling point of the waste water, i.e., from about 60° F. to 120° F. (15.6° C. to 49° C.) while the pH of the waste water is maintained in the range of about 6 to 9.5, preferably 8 to 9 with a pH of about 9 being particularly preferred. The pH adjustment can be made according to conventional known methods. The pH employed is vital or critical to this process. At low pH value below a pH of 6, the biological activity is markedly reduced and at pH values below 8, stripping of ammonia is markedly reduced. At high pH values above 9.5, the biological activity is markedly reduced. The pH adjustment is required and can be made according to conventional known methods, such as the use of small amount of lime or inorganic acid. In the event that an alkali metal hydroxide is used for neutralization instead of lime, there is no danger of forming a calcium carbonate precipitate when the upper pH limit is about 9.5.

On start up a bacterial culture is established on the rotating disks. Waste water is introduced to the disks and injected with aerobic bacteria containing sludge from an activated sludge unit. This activated sludge unit should be accustomed to treating waste water from petroleum refining and petrochemical manufacturing operations. The disks are rotated at approximately 20 rpm to aerate the waste water and sludge mixture without introducing or removing waste water. Bacteria attach themselves to the rotating disks and after a number of days, i.e. 1–5 days, a visible film forms on the disk surfaces. At this time, fresh waste water flow is established and an equivalent flow of effluent drawn off.

During normal operation, the disks are rotated at about 0.25 to about 20 rpm, preferably 0.5 to 2 rpm. Rates higher than the preferable range are appropriate when additional aeration is deemed necessary. Waste water residence time is in the order of 1 to 15 days with 1 to 3 days being preferred. Transient operation will on occasion necessitate longer residence times. Actual residence time is a function of temperature, pH, bacterial culture age and most importantly feed water composition and concentration. Adjustment of actual retention time will be made by routine procedures in view of required water quality.

Disk loadings of 1 lb BOD/(day-1000 ft.$^2$) and greater do not provide sufficient treatment surface areas. Disk loadings of less than 1 lb BOD/(day-1000 ft.$^2$) are therefore recommended. Disk loadings of 0.3 to 0.7 lb BOD/(day-1000 ft.$^2$) are shown in the Example to produce beneficial results. The actual disk surface area (disc loading) chosen is a design parameter dependent on local climatic condition which affect bacterial growth and water quality.

The present method has been found to strip ammonia from waste water without the separate steam stripping stage of conventional methods. The disposal of lime and spent lime sludges has also been eliminated.

The degree of formate removal by the present method was found to be lower than that by a conventional activated sludge unit. The present method however was not as susceptible to feed quality changes as a conventional unit because of the longer bacteria ages. Specifically, cyanide did not adversely affect the present method as it may for some other forms of biological treatment.

The present method is better demonstrated by way of Example.

EXAMPLE

Synthetic ammonium formate solutions were fed to a laboratory scale rotating disk unit at hydraulic retention times of 0.4-day, 0.8-day, and 2.0-days with respective nominal BOD loadings of 2, 1, and 0.4 lb. BOD/(day-1000 ft.$^2$). The treatment performance using the longest hydraulic retention, 2.0 days was compared with and without cyanide added (nominally 10 mg/L as free cyanide). The performance was monitored by determining the pH in the feed, each disk compartment, and the effluent. The formate, TOC, and ammonia concentrations were monitored in the feed, first stage, and effluent three times each week. Nitrate and, when applicable, cyanide concentrations were monitored at the same points once a week.

The unit was fabricated from a 5 inch (i.d.) PVC pipe, positioned horizontally, with end pieces and dividers forming six compartments. The pipe was sliced along the length and hinged on one side to form a cover for the unit. The total operating volume was 3975 ml with the first compartment containing 1210 ml. The 70 disks were arranged along a horizontal shaft with 20 disks in the first compartment and 10 disks in each of the remaining five compartments. The total effective disk surface area was 15.4 square feet. The unit was equipped with a variable speed motor to rotate the disk shaft and with a feed pump and an effluent clarifier.

The biogrowth on the disks was encouraged by placing Activated Sludge Treatment Unit return sludge in each compartment of the disk unit until approximately half the volume was occupied. The remainder was filled with refinery process wastewater. The exit from the last stage was blocked off and the unit was maintained in a static condition, i.e., no forward feed was established, for approximately 1½ days. The disks were rotated at 20 rpm to aerate the mixture in the compartments and to expose the disks uniformly to the biological medium. After this time a visible film had formed on the disk surfaces, indicating that biological growth was starting to attach itself to the disks. The exit from the last stage to the clarifier was opened and the synthetic syngas wastewater feed, viz ammonium formate, was pumped into the first compartment, initially at such a rate that a 0.4-day hydraulic retention was maintained for the unit overall. The BOD loading at this feed rate was nominally 1 lb BOD/(day-1000 ft.$^2$).

The average feed composition was 122 ml of 90% formic acid, 200 ml of concentrated $NH_3$ solution (nominally 28.4% $NH_3$), 30 g $NaHCO_3$ (as buffer), 8.1 g $NaH_2PO_4.H_2O$ and 0.5 g $(NH_4)_2SO_4$ (as nutrients). This formulation would result in a theoretical value of 6,468 mg/L formate ion and 2,547 mg/L ammonia. The theoretical oxygen demand (ThOD) then should have been 1,150 mg/L and, assuming BOD to be $\frac{2}{3}$ ThOD, BOD should have been 767 mg/L [disk loading of 1 lb BOD/(day-1000 ft.$^2$) at hydraulic retention of 0.4-day]. Calculating the ammonia as $NH_3$—N, it should have been 2,098 mg/L.

Early in the evaluation of this waste water there was concern that water might be evaporating across the disk unit, thus increasing the concentrations of the various components in the effluent. Accordingly for a short period during the 0.8-day hydraulic retention evaluation, bromide was added as a tracer ion in the form of 1.5 g NaBr to 20 L of feed (about 50 mg/L bromide ion). NaBr is not removed by biotreatment. Therefore if evaporation of water occurred across the disks, the bromide ion concentration would measurably increase. Data collected over a three week period showed no evidence of significant changes in bromide ion concentration across the reactor.

A hydraulic retention time of 0.4 days was tested. The average estimated BOD loading on the first stage was 4.4 lb BOD/(day-1000 ft.$^2$) and on the entire unit was 1.2 lb BOD/(day-1000 ft.$^2$). Neither formate nor TOC was removed in a consistant manner. Some ammonia removal was observed, 23%, but this was attributed to air stripping by exposure of the very thin film of waste water on the disk to the atmosphere. A strong odor of ammonia was observed in the vicinity of the disks and with the high pH, generally in the region of 9.5 but always above 8, this would be consistent with air stripping of ammonia rather than nitrification.

A hydraulic retention time of 0.8 days was tested. During this part of the evaluation, the average estimated BOD loading on the first stage was 2.3 lb BOD/(day-1000 ft$^2$) and on the entire unit was 0.7 lb BOD/(day-1000 ft.$^2$). Both formate and TOC were removed in a reasonably consistent manner. That is, an average of 38% formate and average of 35% TOC. The ammonia removal was still 23% average and was attributed again to air stripping based on the presence of the ammonia odor.

Since only 35 to 38% of the organics (formate) was removed by the disk unit with 0.8-day hydraulic retention, the feed rate was decreased further to a hydraulic retention of 2.0-days to determine whether a significant increase in formate removal could be achieved.

The first part of the 2.0 day retention test was done using the synthetic syngas waste water without cyanide or bromide being present. The average estimated BOD loading on the first stage was 1 lb BOD/(day-1000 ft.$^2$) and on the entire unit was 0.3 lb BOD/(day-1000 ft.$^2$). The average formate removal at these loadings was 56% and the average TOC removal 52%. While these were significant, the degree of treatment was disappointing considering that the BOD loading rate was less than half that for the 0.8-day hydraulic retention. A previous test that activated sludge units with 2.0-day hydraulic retention were able to treat calcium formate syngas wastewaters with about 98% TOC removal.

The ammonia removal was greater during this period, increasing to an average of 41%. Nitrate measurements were made but no significant amounts of nitrate were observed in the effluent. Therefore the ammonia being removed was not being nitrified. The mechanism for ammonia removal was attributed to air stripping by contact of the thin film of waste water on the disk surfaces with the atmosphere.

During the second part of the 2.0 day retention test, sodium cyanide was added to the synthetic syngas waste water to give an expected free cyanide ion concentration of 10 mg/L. The average BOD loading on the first stage was 1 lb BOD/(day-1000 ft.$^2$) while it was 0.3 lb BOD/(day-1000 ft.$^2$) for the entire unit. The average removals were slightly better, 61% formate and 57% TOC, respectively. The free cyanide measured in the feed was seldom as high as 10 mg/L and averaged 4.9 mg/L. The cyanide removal averaged 88%. At this cyanide level, no effect on the formate or TOC removal was observed and cyanide did not present problems in disk unit operations.

The ammonia removal was 43% and was attributed to stripping by air exchange with the thin film of waste water on the disk surfaces since nitrate analyses did not show any increase in nitrate content of the disk unit effluent.

The principle of the invention and the best mode contemplated for applying the principle have been described. It is to be understood that the foregoing is illustrative only and that other means and techniques can be employed without departing from the true scope of the invention defined in the following claims.

What is claimed is:

1. In a method for environmentally upgrading a waste water stream produced in the quench step of a process for the production of synthesis gas by reacting a carbonaceous fuel with an oxygen rich gas in a free flow, non catalytic synthesis gas generator at a temperature in the range of from a 1500° F. to 3000° F. and a pressure in the range of 1 to 250 atmospheres, the waste water stream being characterized by having toxic and corrosive properties due to the presence of 5 to 1,000 ppm cyanides, 100 to 20,000 ppm formates and 100 to 10,000 ppm ammonia, which method consists essentially of stripping ammonia and treating cyanides and formates with aerobic bacteria thereby degrading cyanides and formates and as a result environmentally upgrading the waste water stream; wherein the improvement comprises:

immobilizing the aerobic bacteria on a plurality of disks of a rotating disk contactor; positioning and rotating the disks relative to the waste water and air such that the immobilized bacteria are successively wetted with the waste water and exposed to air; rotating the disks at a velocity of 0.25 to 20 rpm; maintaining a waste water pH of 6 to 9.5, temperature of 5° C. to 40° C., residence time of 1 to 15 days and loading the disks with 0.3 to 0.7 lb BOD/(day-1000 ft.$^2$); thereby air stripping the ammonia and bacterially degrading the cyanides and formates.

2. The method of claim 1 wherein the velocity is 0.5 to 1 rpm.

3. The method of claim 1 wherein the residence time is 1 to 3 days.

4. The method of claim 1 wherein the waste water pH is maintained at from 8 to 9.

5. The method of claim 1 wherein the waste water pH is maintained at about 9.

* * * * *